(12) United States Patent
Widlak

(10) Patent No.: US 6,387,433 B1
(45) Date of Patent: May 14, 2002

(54) FLUID EMULSIFIED SHORTENING COMPOSITION

(75) Inventor: Neil Widlak, Decatur, IL (US)

(73) Assignee: Archer-Daniels-Midland Company, Decatur, IL (US)

( * ) Notice: Subject to any disclaimer, the term of this patent is extended or adjusted under 35 U.S.C. 154(b) by 29 days.

(21) Appl. No.: 09/594,161

(22) Filed: Jun. 15, 2000

Related U.S. Application Data
(60) Provisional application No. 60/139,733, filed on Jun. 18, 1999.

(51) Int. Cl.[7] .............................................. A23D 9/007
(52) U.S. Cl. ...................................... 426/606; 426/601
(58) Field of Search ................................ 426/601, 606; 554/227

(56) References Cited

U.S. PATENT DOCUMENTS

| | | | |
|---|---|---|---|
| 3,857,985 A | 12/1974 | Reid et al. | 426/362 |
| 3,914,452 A | 10/1975 | Norris | 426/549 |
| 3,914,453 A | 10/1975 | Gawrilow | 426/553 |
| 3,943,259 A | 3/1976 | Norris | 426/24 |
| 4,137,338 A | 1/1979 | Gawrilow | 426/601 |
| 4,226,894 A | 10/1980 | Gawrilow | 426/606 |
| 4,234,606 A | 11/1980 | Gawrilow | 426/24 |
| 4,335,157 A | 6/1982 | Varvil | 426/606 |
| 4,359,482 A | 11/1982 | Crosby | 426/606 |
| 4,684,526 A | 8/1987 | Knightly | 426/19 |
| 4,889,740 A | 12/1989 | Price | 426/606 |
| 5,185,173 A | 2/1993 | Bethke et al. | 426/549 |
| 5,211,981 A | 5/1993 | Purves et al. | 426/606 |
| 5,254,356 A | 10/1993 | Busken | 426/553 |
| 5,362,512 A | 11/1994 | Cabrera et al. | 426/601 |
| 5,436,021 A | 7/1995 | Bodor et al. | 426/606 |
| 5,514,404 A | 5/1996 | Zimmerman et al. | 426/549 |

FOREIGN PATENT DOCUMENTS

| | | |
|---|---|---|
| DE | 291 240 | 6/1991 |
| JP | 53-124517 | 10/1978 |
| JP | 55-74750 | 6/1980 |
| JP | 61-21049 | 1/1986 |
| JP | 61-25446 | 2/1986 |

OTHER PUBLICATIONS

International Preliminary Examination Report for International Application No. PCT/US00/16377, completed Jul. 19, 2001.
English Language abstract of JP 53–124517, Derwent World Patents Index Accession No, 1978–88476A/197849.
English Language abstract of JP 79–39460, Derwent World Patents Index Accession No. 1979–92183B/197951.
English Language abstract of JP 55–74750, Derwent World Patents Index Accession No. 1980–50880C/198029.
English Language abstract of JP 61–21049, Derwent World Patents Index Accession No. 1986–071911/198611.
English Language abstract of JP 61–25446, Derwent World Patents Index Accession No. 1986–073745/198611.
English Language abstract of DD 291 240, Derwent World Patents Index Accession No. 1991–340682/199147.
Written Opinion of International Application No. PCT/US00/16377, with separate sheets, mailed Mar. 22, 2001.

*Primary Examiner*—Carolyn Paden
(74) *Attorney, Agent, or Firm*—Sterne, Kessler, Goldstein & Fox PLLC

(57) ABSTRACT

The present invention provides a fluid emulsified shortening composition for use in yeast-raised food processing which will remain fluid at room temperature and improve the quality of yeast-raised food. The fluid emulsified shortening composition comprises a first emulsifier comprising one or more compounds selected from the group consisting of edible salts of stearoyl lactylate and diacetic tartaric acid esters of monoglycerides, a second emulsifier comprising one or more monoglycerides, a third emulsifier comprising lecithin, and a shortening comprising a liquid edible oil, wherein the weight ratio of the shortening to the sum of the emulsifiers is from about 4:1 to about 1:1.

95 Claims, No Drawings

FLUID EMULSIFIED SHORTENING COMPOSITION

CROSS-REFERENCE TO RELATED APPLICATIONS

This application claims the benefit of of U.S. Provisional Application Serial No. 60/139,733, filed Jun. 18, 1999, which is herein incorporated by reference.

BACKGROUND OF THE INVENTION

1. Field of the Invention

This invention relates to a fluid emulsified shortening composition for use in yeast-raised food processing and a process for preparing such a fluid emulsified shortening composition. This invention also relates to yeast-raised food containing such a composition and to processes for the production of this yeast-raised food.

2. Related Art

Shortenings are useful in the preparation of yeast-raised food and bread-making processes. In the production of bread, they are used to soften crumb texture, retard staling and improve loaf volumes. Although plastic shortenings can be used for a variety of baking applications, since fluid shortenings can be transferred and stored as liquids at room temperature and can be pumped and metered to dough mixers, fluid shortenings are preferred over plastic or solid shortenings by commercial bakers. See Tubb, G., "The Use of Liquid Shortening in Bread," *Proc. Am. Soc. Bakery Engineers* 1966:102–106 (1966). Based on cost and convenience factors, it is common industry practice to use a fluid oil shortening in the production of white pan bread.

Dough conditioners, dough strengtheners, crumb softeners and emulsifiers are all terms describing ingredients used in the preparation of yeast-raised food to aid in production and/or improve certain quality factors. These ingredients interact with flour protein and are added to yeast-raised food to improve the dough's gas retention properties, to increase loaf volume, symmetry, texture and grain and/or to retard the rate of crumb firming or staling. When these terms are used to classify an ingredient, the term usually represents the predominant function of the ingredient, and not necessarily its only function. See Newbold, M., "Crumb Softeners and Dough Conditioners," *Bakers Digest* 50:37–40 (1976); Dubois, D. K., "Dough Strengtheners & Crumb Softeners: I. Definition & Classification," *AIB Technical Bulletin*, Vol. I, Issue 4 (April, 1979); Dubois, D. K., "Dough Strengtheners & Crumb Softeners: II. Products, Types & Functions," *AIB Technical Bulletin*, Vol. 1, Issue 5 (May, 1979).

Sodium stearoyl lactylate (SSL), calcium stearoyl lactylate (CSL) and diacetic tartaric acid esters of monoglycerides (DATEMS) are the most effective commercial dough conditioners emulsifiers. They are solid at room temperature and are used in powder or bead form. See, Flack, E. A. and Krog., N., "The Functions and Applications of Some Emulsifying Agents Commonly Used in Europe," *Binsted's Food Trade Review* 40:27–33 (1970).

Lecithins are also used as dough conditioners and are commercially available in fluid forms that can be easily pumped. In the production of bread, they can improve the dryness and extensibility of doughs, the shortening ability of fat, and also the volume, symmetry and shelf-life of the end product. See Aust, K., "Applications of Lecithin in Bakery Foods," *AIB Technical Bulletin*, Vol. XV, Issue 12 (December, 1993).

Highly saturated distilled monoglycerides are the most effective commercial stale retarding emulsifiers. These crumb softening emulsifiers are added to bread to complex with starch to soften the crumb and retard staling due to starch retrogradation during storage. See Krog, N., "Dynamic and Unique Monoglycerides," *Cereals Foods World* 24:10–11 (1979). Since the highly saturated monoglycerides are solid at room temperature, they are used in a powder or a bead form.

U.S. Pat. Nos. 3,914,452 and 3,943,259 (Norris; SCM Corporation) disclose a stabilized fluid shortening having beta-fat crystals dispersed in liquid vegetable oil and comprising 4 to 14 weight parts of soft mono- and diglycerides derived from vegetable oil and having an Iodine Value (IV) of at least about 40; 2 to 8 weight parts of ester emulsifiers selected from ethoxylated monoglyceride, ethoxylated sorbitan, ethoxylated mannitans, ethoxylated monooleates, sodium stearoyl-1-lactylate, calcium stearoyl-2-lactylate, sodium stearoyl-2-lactylate, ethoxylated triglycerol monostearate, and succinylated monoglyceride; 2 to 8 weight parts of solid stearine; and about 40 to 100 weight parts of liquid vegetable oil. The fluid shortening can be produced as a concentrate and can be hydrated with water to produce a hydrated fluid shortening.

U.S. Pat. No. 4,137,338 (Gawrilow; SCM Corporation) discloses a temperature stable fluid food emulsifier concentrate for yeast-raised products consisting essentially of a normally liquid partial glycerol ester food emulsifier vehicle in which an ethoxylated fatty acid ester is stably dispersed and a solid phase beta-crystalline food emulsifier component. The concentrate is mechanically dispersible into a comestible mixture for emulsification, and the proportions of ingredients are about 10% to about 70% liquid partial glycerol ester, about 15% to about 72% ethoxylated fatty acid ester and about 4% to about 54% solid phase beta-crystalline food emulsifier.

U.S. Pat. No. 4,226,894 (Gawrilow; SCM Corporation) discloses a temperature stable fluid shortening for yeast-raised products consisting essentially of an emulsifier concentrate comprising a normally liquid or soft partial glycerol ester emulsifier having an IV in the range of about 40–150, an ethoxylated fatty acid emulsifier, a solid beta-phase crystalline food emulsifier, and optionally soybean stearine in the proportions of about 4–10 parts glycerol ester, about 2–8 parts ethoxylated fatty acid ester, about 2–8 parts crystalline food emulsifier, and about 0–3 parts stearine; a liquid vegetable oil in the proportion of about 40–70 weight parts vegetable oil to about 8–29 parts emulsifier concentrate; and water which is emulsified with the oil and emulsifier concentrate in the proportion of about 45–75% water to about 25–55% lipoidal materials.

U.S. Pat. No. 4,234,606 (Gawrilow; SCM Corporation) discloses a stabilized fluid shortening for use in baking comprising about 4 to 10 weight parts of soft or hard mono- and diglycerides, about 2 to 8 weight parts of ethoxylated fatty acid ester emulsifier, about 2 to 8 weight parts of solid beta-phase crystalline food emulsifier selected from the group consisting of an alkali or alkaline earth metal salt of an acyl lactylate and a succinylated mono- and diglyceride, about 0 to 3 weight parts solid stearine, and about 40 to about 70 weight parts of liquid vegetable oil, wherein the fluid shortening is in a stabilized dispersion.

U.S. Pat. No. 4,335,157 (Varvil; SCM Corporation) discloses a stabilized fluid shortening having beta-fat crystals dispersed in liquid vegetable oil which comprises about 4 to about 10 weight parts of a soft or hard mono- and diglyceride, about 2 to about 8 weight parts of fatty acid esters of polyglycerol, about 2 to about 8 weight parts of a solid beta-phase fine crystalline food emulsifier component, and about 40 to about 100 weight parts of liquid vegetable oil.

U.S. Pat. No. 4,889,740 (Price; Beatrice/Hunt-Wesson, Inc.) discloses a pourable shortening comprising a suspension of solid fatty glyceride particles having a melting point greater than about 100° F. in a liquid glyceride oil having an IV from about 90 to about 130. The solid fatty glyceride particles have a maximum particle size of less than or equal to about 70 microns with at least 90% of the particles having a particle size less than about 45 microns and at least 80% having a particle size less than 30 microns, and at least 80% of the fatty glyceride particles are in the beta crystal phase. The pourable shortening has a total solids content ranging from about 2% to about 18% by weight, a viscosity from about 200 cps to about 25,000 cps, and is pumpable at ambient temperature after storage over the temperature range from about 0° F. to about 100° F. without undergoing separation or permanent loss of fluidity.

U.S. Pat. No. 5,211,981 (Purves et al.; The Procter & Gamble Company) discloses a process for making a liquid pourable shortening comprising preparing a melted base oil containing between about 96% and 100% melted partially hydrogenated edible oil having an IV between about 90 and 133 and between 0% and about 4% melted highly hydrogenated edible oil having an IV of not more than about 8, and then blending a melted emulsifier containing at least about 30% monoglyceride with the melted base oil in proportions so that the monoglyceride content of the total blend is between about 12% and about 16%.

U.S. Pat. No. 5,254,356 (Busken; Bunge Foods Corporation) discloses a liquid shortening emulsifier system for use in the preparation of chemically leavened cakes consisting essentially of a liquid blend of at least about 85% of a liquid vegetable oil composition, between about 1.5% and about 8% of propylene glycol monoester emulsifiers and between about 1% and about 5% of diacetyl tartaric acid esters of monoglycerides, wherein the propylene glycol monoester emulsifiers and the diacetyl tartaric acid esters of monoglycerides are at a weight ratio of between about 0.4:1 to about 4:1.

Due to the ease of handling, pumping and metering, fluid shortenings are much preferred for use in commercial baking processes. It would be both cost effective and convenient if the shortening and emulsifiers could be combined into a single fluid emulsified shortening that can be pumped at room temperature while at the same time provide improved dough conditioning and stale retarding properties.

SUMMARY OF THE INVENTION

Accordingly, the present invention provides a fluid emulsified shortening composition for use in yeast-raised food processing which will remain fluid at room temperature and improve the quality of yeast-raised food.

It was unexpectedly discovered that a combination of one or more edible salts of stearoyl lactylate or diacetic tartaric acid esters of monoglycerides, one or more monoglycerides, lecithin and a liquid edible oil, when added at about 3% to the weight of flour, and wherein the weight ratio of the oil to the sum of the three emulsifiers is between 4:1 and 1:1, will produce bread which has a softer crumb texture and greater loaf volume than bread made using common commercial practices. In addition, it was unexpectedly discovered that the performance properties of the emulsifiers were enhanced in the fluid emulsified shortening composition of the present invention.

Thus, the present invention relates to a fluid emulsified shortening composition which contains a unique combination of one or more edible salts of stearoyl lactylate and diacetic tartaric acid esters of monoglycerides, one or more monoglycerides, lecithin and a liquid edible oil. This unique fluid emulsified shortening composition remains fluid at room temperature and provides effective dough conditioning and stale retarding properties.

The present invention also relates to a process for producing a fluid emulsified shortening composition for use in yeast-raised food processing. The process comprises blending a first emulsifier comprising one or more edible salts of stearoyl lactylate and DATEMS, a second emulsifier comprising one or more monoglycerides and a third emulsifier comprising lecithin with a shortening comprising a liquid edible oil to produce a mixture, processing the mixture by heating to produce a molten blend, processing the molten blend by cooling to produce a chilled blend and processing the chilled blend by agitating to produce a fluid emulsified shortening composition. The invention further relates to a fluid emulsified shortening composition produced by this process.

In another aspect of the present invention there is provided a process for producing an edible product. The process comprises blending a first ingredient comprising one or more edible compounds in an appropriate form with a second ingredient comprising the fluid emulsified shortening composition of the present invention to produce a mixture. The mixture is then processed by baking to produce an edible product. The invention also relates to edible products produced by this process.

The present invention also relates to a process for improving the quality of yeast-raised food which comprises adding to the yeast-raised food or to a preparative component thereof an effective amount of the fluid emulsified shortening composition of the present invention.

DETAILED DESCRIPTION OF THE PREFERRED EMBODIMENTS

Before describing the invention in detail, several terms used in this specification will be defined.

By the term "acetone insolubles level" is meant the amount of phosphatides in lecithin. The concentration of phosphatides is usually reported as "percent acetone-insolubles." The acetone insolubles level may be determined, for example, by A.O.C.S. Official Method Ja 4-46 (1993).

By the term "acid value" is meant the number of milligrams of potassium hydroxide required to neutralize the free fatty acid in one gram of a substance. It is a measure of the free fatty acid present in the sample. The acid value may be determined, for example, by A.O.C.S. Official Method Cd 3d-63 (1993).

By the term "emulsifier" is meant a natural or synthetic substance that promotes the formation and improves the stability of emulsions. The unifying characteristic of emulsifiers is the presence of a hydrophilic group and a lipophilic group on the same molecule. The variability in the performance of different emulsifiers is due to the relative potency of the two kinds of regions, their spatial relationship, the size of the entire molecule and certain other factors. Performance testing is usually the only solution to the problem of selecting an appropriate emulsifier or emulsifier blend.

By the term "ester value" is meant the number of milligrams of potassium hydroxide required to saponify the esters present in one gram of a substance. Ester value is also the difference between the saponification value and the acid value.

By the term "fluid" is meant flowable or pumpable. For the purposes of the present invention the term is not necessarily synonymous with liquid. A fluid shortening normally is considered to have both liquid and solid phases, the latter being in the form of solid particles of fat and emulsifier in suspension. The term liquid implies no solid phase.

By the term "hydrogenated" is meant the process by which hydrogen is added directly to points of unsaturation in the fatty acid moieties of oil molecules. By the term "partially hydrogenated" is meant that some, but not all, of the double bonds are saturated. Hydrogenation has developed as a result of the need to increase the stability of fat or oil to oxidative rancidity.

By the term "Iodine Value"(IV) is meant the number of grams of iodine equivalent to the halogen absorbed by a 100 gram sample of an oil or fat and may be determined, for example, by the Wijs Method, which is A.O.C.S. Official Method Cd 1-25 (1993). During hydrogenation, the consistency of a fat or oil becomes more solid as unsaturated triglyceride molecules become more saturated by the addition of hydrogen. Thus, in general, the lower the IV of a given sample, the greater its content of solids at a given temperature.

By the term "room temperature" is meant ambient temperature, or from about 650° F. to about 80° F.

By the term "saponification value" is meant the number of milligrams of potassium hydroxide required to saponify one gram of a substance. Fats with high molecular weight have low saponification values, whereas those with low molecular weight have high saponification values. The saponification value may be determined, for example, by A.O.C.S. Official Method Cd 3-25 (1993).

By the term "winterized" is meant the process of holding oil at low temperatures until the high melting molecules form solid particles large enough to be filtered out. Winterization is a specialized form of the overall process of fractional crystallization. By removing the high melting fractions, i.e., triglycerides containing longer-chain fatty acids, the oil remains clear when stored at low temperatures for long periods.

Unless otherwise stated, all percentages herein are expressed as weight percent.

In one embodiment, the present invention relates to a fluid emulsified shortening composition comprising a first emulsifier comprising one or more compounds selected from the group consisting of edible salts of stearoyl lactylate and diacetic tartaric acid esters of monoglycerides, a second emulsifier comprising one or more monoglycerides, a third emulsifier comprising lecithin, and a shortening comprising a liquid edible oil, wherein the weight ratio of the shortening to the sum of the emulsifiers is from about 4:1 to about 1:1.

Exemplary of the stearoyl lactylate component are alkali and alkaline-earth stearoyl lactylates such as calcium stearoyl lactylate, sodium stearoyl lactylate or potassium stearoyl lactylate. The fatty acid lactylates and process for their manufacture are described in detail in U.S. Pat. No. 2,733,252. The two most common edible salts of stearoyl-2-lactylate are sodium stearoyl-2-lactylate and calcium stearoyl-2-lactylate.

Specific procedures for producing the lactylates are set forth in U.S. Pat. No. 2,789,992 insofar as sodium stearoyl-2-lactylate ester is concerned. U.S. Pat. No. 2,733,252, which describes the preparation of sodium stearoyl-2-lactylate from stearic acid, sodium hydroxide, carbonate or bicarbonate and lactylic acid, also sets forth the parameters for the production of the calcium stearoyl lactylate composition. Both calcium and sodium stearoyl-1-lactylate and stearoyl-2-lactylate may be used in the present invention. Particular reference is also made to 21 C.F.R. §§172.844 and 172.846 which describe the conditions for use of the food additives calcium stearoyl-2-lactylate and sodium stearoyl-2-lactylate, respectively.

The fluid emulsified shortening composition may also include polycarboxylic acid esters of monoglycerides. Diacetic tartaric acid esters of monoglycerides (DATEMS) are formed by reacting diacetyltartaric anhydride with partial glycerides of edible oils, fats or fat-forming fatty acids. Sources of glycerides for the production of DATEMS include, for example, soybean oil, palm oil, sunflower oil, beef tallow and monoglycerides. DATEMS may also be obtained from commercial sources either as a powder or a paste.

In a preferred embodiment, the first emulsifier comprises calcium stearoyl lactylate. More preferably, the first emulsifier is calcium stearoyl lactylate having an acid value from about 60 to about 80 and an ester value from about 150 to about 190.

Monoglycerides consist of a fatty acid chemically combined on a glycerol residue. The uncombined —OH groups on the glycerol moiety act as the hydrophilic portion of the molecule. Monoglycerides can be prepared from many types of fats and oils, such as lard and vegetable oils. The hardness of the oil, as indicated by the IV, has an effect on the functionality of the monoglyceride prepared from it. The monoglycerides suitable for use in accordance with this invention may be prepared, for example, by conventional methods of glycerolysis of edible fats and oils.

In another embodiment, the second emulsifier comprises a monoglyceride having an IV from about 50 to about 120. Most preferably, the monoglyceride is distilled and has an IV from about 75 to about 85. The distilled monoglyceride may be derived from a variety of sources including, for example, cottonseed oil, palm oil, peanut oil, rapeseed oil, soybean oil and canola oil.

Lecithin, or phosphatidylcholine, is a phosphatide found in all living plants and animals. Lecithin is a mixture of the diglycerides of stearic, palmitic, oleic, linoleic and linolenic acids linked to the choline ester of phosphoric acid. Examples of lecithins which may be used include those derived from plants such as soybean, rapeseed, sunflower or corn, and those derived from animal sources such as egg yolk. Lecithin derived from soybean oil is preferred.

Commercially available lecithin is preferred for use in the present invention. Lecithin is prepared commercially primarily from soybean oil. It exists preformed in crude soybean oil, and the commercial method of preparation involves precipitation from the oil and subsequent purification. It may be further processed by bleaching, fractionation, hydrolysis, acetylation, extraction, hydroxylation, and the like. In a preferred embodiment, a standard, modified, fractionated or lyso lecithin derived from soybean oil is used. Particular reference is made to 21 C.F.R. §184.1400 which describes the use conditions for commercial lecithin.

Commercial grades of lecithin are classified according to total phosphatides, color and fluidity. The amount of phosphatides in commercial lecithin generally ranges between about 50% and about 97%. The concentration of phosphatides is usually reported as "percent acetone-insolubles." In a preferred embodiment, the soybean oil-derived lecithin has an acetone insolubles level from about 60% to about 62%.

Besides providing dough conditioning properties, it was discovered that lecithin decreased the shortening viscosity beyond what could be delivered from an equivalent amount of vegetable oil. A blend of vegetable oil, CSL and monoglycerides at proportions used in commercial bread formulas would not be fluid at room temperature, and substituting other crumb softeners or dough conditioners into the formula of the present invention will produce a shortening that is not fluid. While not wishing to be bound to any particular theory, it is believed that the lecithin acts as a crystal retardant to prevent the CSL and monoglyceride from forming extensive crystalline networks that can entrap large amounts of liquid oil and increase the viscosity of the shortening.

Any edible oil that is fluid at room temperature may be used in the present invention, including marine and vegetable oils. In a preferred embodiment, the shortening comprises a liquid vegetable oil. The vegetable oils are usually classified into groups according to their fatty acid composition. In this manner, the oils can be divided into the lauric acid containing fats (e.g., coconut and palm kernel oils), linoleic acid oils (e.g., cottonseed oil), erucic acid oils (e.g., rapeseed oil) and linolenic acid oils (e.g., soybean oil). In a preferred embodiment, the liquid vegetable oil is soybean oil.

The poor stability of unhydrogenated soybean oil can be offset by hydrogenation. Partially hydrogenated soybean oil is a major component of vegetable shortenings. Fully hydrogenated soybean oil crystallizes which limits its usage in this form. Since hydrogenated soybean oil deposits crystalline fats on being chilled, the oil can be winterized. Most preferably, the shortening is a partially hydrogenated and winterized soybean oil having an IV between 100 and 110 (WSBO).

The vegetable oil composition typically will comprise from about 50% to about 80% by weight of the fluid emulsified shortening composition. Preferably, the vegetable oil composition will make up about 67% by weight of the of the fluid emulsified shortening composition. The first, second and third emulsifiers will typically each comprise from about 5% to about 17% by weight of the fluid emulsified shortening composition. Preferably, each comprises about 11% by weight of the fluid emulsified shortening composition.

The weight ratio of the liquid vegetable oil shortening to the sum of the emulsifiers can vary from about 4:1 to about 1:1. Preferably, the weight ratio of the shortening to the sum of the emulsifiers is about 2:1.

In another aspect of the invention there is provided a process for producing a fluid emulsified shortening composition for use in yeast-raised food processing. The process comprises blending a first emulsifier comprising one or more edible salts of stearoyl lactylate and diacetic tartaric acid esters of monoglycerides, a second emulsifier comprising one or more monoglycerides and a third emulsifier comprising lecithin with a shortening comprising a liquid edible oil to produce a mixture, processing the mixture by heating to produce a molten blend, processing the molten blend by cooling to produce a chilled blend and processing the chilled blend by agitating to produce a fluid emulsified shortening composition.

In a preferred embodiment, the first emulsifier comprises calcium stearoyl lactylate. More preferably the first emulsifier comprises calcium stearoyl lactylate having an acid value from about 60 to about 80 and an ester value from about 150 to about 190.

In another preferred embodiment, the second emulsifier comprises a distilled monoglyceride having an IV from about 50 to about 120, more preferably from about 75 to about 85.

In another preferred embodiment, the third emulsifier comprises lecithin derived from soybean oil. More preferably, the soybean oil-derived lecithin has an acetone insolubles level from about 60% to about 62%.

In another preferred embodiment, the shortening comprises a liquid vegetable oil. More preferably, the shortening comprises a partially hydrogenated and winterized soybean oil having an IV from about 100 to about 110.

The first, second and third emulsifiers will typically each comprise from about 5% to about 17% by weight of the fluid emulsified shortening composition. Preferably, each comprises about 11% by weight of the fluid emulsified shortening composition.

The weight ratio of the liquid vegetable oil shortening to the sum of the emulsifiers can vary from about 4:1 to about 1:1. Preferably, the weight ratio of the shortening to the sum of the emulsifiers is about 2:1.

The mixture produced by blending the emulsifiers with the shortening is heated to a temperature sufficient to melt all of the components, which usually requires temperatures of about 140° F. to about 180° F. The molten blend is then cooled quickly. In a preferred embodiment, the molten blend is cooled to a temperature of about 60° F. to about 70° F. within about five minutes by passing the molten blend through a heat exchanger or another unit appropriate for quick chilling. An example of such a heat exchanger is the Votator A unit chilling machine.

Subsequent to the cooling step, the chilled blend is agitated. The chilled blend may be passed, for example, to a non-chilled agitator commonly referred to as a Votator B unit. The Votator System which includes an A unit and a B unit is described in U.S. Pat. No. 3,568,463, and the process of the Votator System is described in U.S. Pat. No. 3,455,700. Instead of, or in addition to, B unit agitation, the resulting chilled blend may be passed to an agitated holding tank for further continuous agitation. In a preferred embodiment, the chilled blend is agitated for at least two hours to prevent the development of crystal networks that can decrease fluidity over time.

Following agitation, the fluid emulsified shortening composition may be blended with other ingredients and baked to produce an edible product such as bread, or it may be stored for future use in yeast-raised food processing. The shortening composition of the present invention will remain fluid and stable against separation of components over normally encountered temperatures. A shortening composition produced by the aforementioned process has remained fluid over a temperature range from about 65° F. to about 80° F. without any significant change in viscosity for greater than four months.

In another aspect of the present invention there is provided a fluid emulsified shortening composition for use in yeast-raised food processing which is produced by any one of the above processes.

In another aspect of the invention there is provided a process for producing an edible product. The process comprises blending a first ingredient in an appropriate form with the fluid emulsified shortening composition of the present invention to produce a mixture, and then baking the mixture to produce an edible product. Edible products produced by this process are also an aspect of the invention.

In a preferred embodiment, the edible product is a yeast-raised food. Most preferably, the yeast-raised food is bread. When the end-product is bread, it is preferred that the fluid emulsified shortening composition is added at about 3% to the weight of flour. Particular reference may be made to 21

C.F.R. §136.110 which provides requirements for specific standardized bakery products.

In another aspect of the invention there is provided a process for improving the quality of yeast-raised food. The process comprises adding to the yeast-raised food or a preparative component thereof an effective amount of the fluid emulsified shortening composition of the invention. In a preferred embodiment, the yeast-raised food is bread. By the term "effective amount" is meant that quantity sufficient to improve any quality of yeast-raised food as determined by performance tests known in the art.

In yet another aspect of the present invention there is provided a process for retarding the staling of yeast-raised food. The process comprises adding to yeast-raised food or to a preparative component thereof an effective amount of the fluid emulsified shortening of the present invention. In a preferred embodiment, the yeast-raised food is bread. By the term "effective amount" is meant that quantity sufficient to retard the staling of yeast-raised food as determined by performance tests known in the art.

In another aspect of the present invention there is provided a process for conditioning yeast-raised food. The process comprises adding to yeast-raised food or to a preparative component thereof an effective amount of the fluid emulsified shortening of the present invention. In a preferred embodiment, the yeast-raised food is bread. By the term "effective amount" is meant that quantity sufficient to condition yeast-raised food as determined by performance tests known in the art.

In another aspect of the present invention there is provided a process for retarding the oxidation of yeast-raised food. The process comprises adding to yeast-raised food or to a preparative component thereof an effective amount of the fluid emulsified shortening of the present invention. In a preferred embodiment, the yeast-raised food is bread. By the term "effective amount" is meant that quantity sufficient to retard the oxidation of yeast-raised food as determined by performance tests known in the art.

In another aspect of the present invention there is provided a process for improving the crumb texture and loaf volume of bread. The process comprises adding to bread or to a preparative component thereof an effective amount of the fluid emulsified shortening of the present invention. By the term "effective amount" is meant that quantity sufficient to improve the crumb texture and loaf volume of bread as determined by performance tests known in the art.

Having now generally described the invention, the same will be more readily understood through reference to the following Examples which are provided by way of illustration, and are not intended to be limiting of the present invention, unless specified.

EXAMPLE 1

Preparation of a Fluid Emulsified Shortening Composition

A fluid emulsified shortening composition was prepared by blending together 11% by weight CSL with an acid value between 60 and 80 and an ester value between 150 and 190, 11% by weight standard lecithin with an acetone insolubles level of about 62%, and 1 1% by weight distilled monoglycerides with an IV between 75 and 85 with 67% by weight partially hydrogenated and winterized soybean oil with an IV between 100 and 110 (WSBO). The mixture was heated to about 160° F., and the molten blend was quickly cooled to about 60–70° F. within five minutes by passing the molten blend through a heat exchanger. The chilled blend was kept under agitation for at least two hours following the cooling.

EXAMPLE 2

Performance Property Baking Experiments

Baking experiments were conducted to demonstrate the performance properties of common commercial emulsifier systems and the fluid emulsified shortening composition of the present invention in white pan bread. Loaf volume and bread texture were the two quality parameters used to demonstrate the differences in performance properties.

It is common commercial practice to use 2% flour weight basis of vegetable oil and 1% flour weight basis of dough conditioners and staling inhibitors in white pan bread. The following fluid emulsified shortening formula added at 3% to the weight of flour will deliver 2% shortening and 1% total emulsifiers:

| Shortening: | 67% Liquid Edible Oil |
|---|---|
| Emulsifiers: | 11% CSL, SSL or DATEMS |
| | 11% Lecithin |
| | 11% Monoglyceride |

The bread formula and procedures were obtained from the American Institute of Baking (Manhattan, Kans.). In conducting the baking experiments, the following bread formula was used:

| | Ingredient | (Flour Weight Basis) |
|---|---|---|
| Sponge: | Flour | 60.00% |
| | Vital wheat gluten | 6.00% |
| | Water | 40.60% |
| | Yeast | 1.25% |
| Dough: | Flour | 40.00% |
| | Non-fat dry milk | 2.00% |
| | Sugar | 8.00% |
| | Salt | 2.25% |
| | Oil | 2.00% |
| | Emulsifiers | 1.00% |
| | Water | 29.60% |
| | Yeast | 0.50% |

In the first experiment (Variable A), the common commercial practice of adding shortening and emulsifiers separately was utilized. The percentage of each ingredient to the weight of flour was as follows: 2% WSBO, 0.33% SSL, 0.33% 20–25 IV distilled monoglyceride and 0.33% standard 62% acetone insolubles lecithin.

In the second experiment (Variable B), the common commercial practice of adding shortening and emulsifiers separately was also utilized. The percentage of each ingredient to the weight of flour was as follows: 2% WSBO, 0.33% CSL having an acid value between 60 and 80 and an ester value between 150 and 190, 0.33% 60–65 IV distilled monoglyceride and 0.33% standard 62% acetone insolubles lecithin.

In the third experiment, the fluid emulsified shortening composition of the present invention was added at 3.00% to the weight of flour. The percentage of each ingredient to the weight of flour was as follows: 2% WSBO, 0.33% CSL having an acid value between 60 and 80 and an ester value between 150 and 190, 0.33% 75–85 IV distilled monoglyceride and 0.33% standard 62% acetone insolubles lecithin.

The bread was sliced after baking and stored for seven days at room temperature in a sealed plastic bag. On the seventh day, crumb texture was measured using a TA-TX2 texture analyzer with a 1.5 inch round, flat acrylic probe. Crumb texture is measured as the force in grams required to penetrate the probe 10 mm into the center of two 12.5 mm thick slices of bread. Loaf volume was measured by the standard rapeseed displacement method one hour after baking. The results of the three experiments are shown in the following table:

| Shortening and Emulsifier | Seventh Day Texture (g force) | Loaf Volume (cc/g) |
|---|---|---|
| Variable A (commercial practice) | 524 | 5.44 |
| Variable B (commercial practice) | 557 | 5.15 |
| Fluid Emulsified Shortening Composition | 456 | 5.62 |

The results indicate that the bread made with the fluid emulsified shortening composition had softer crumb texture and greater loaf volume than bread made using either of the common commercial practices. Furthermore, since the components used in the Variable B experiment (commercial practice) and the fluid emulsified shortening composition were identical, the results indicate that the performance properties of the CSL and the distilled monoglycerides were enhanced in the fluid emulsified shortening composition.

All publications mentioned herein are hereby incorporated in their entirety by reference.

In view of the foregoing description taken with the Examples, those skilled in the art will be able to practice the invention in various enablements and embodiments without departing from the spirit and scope of the invention as defined in the appended claims.

What is claimed is:

1. A fluid emulsified shortening composition comprising:
   (a) a first emulsifier comprising one or more compounds selected from the group consisting of edible salts of stearoyl lactylate and diacetic tartaric acid esters of monoglycerides;
   (b) a second emulsifier comprising one or more monoglycerides;
   (c) a third emulsifier comprising lecithin; and
   (d) a shortening comprising a liquid edible oil, wherein the weight ratio of said shortening (d) to the sum of said emulsifiers (a), (b) and (c) is from about 4:1 to about 1:1.

2. The composition of claim 1, wherein said first emulsifier (a) comprises one or more compounds selected from the group consisting of calcium stearoyl lactylate and sodium stearoyl lactylate.

3. The composition of claim 2, wherein said first emulsifier (a) comprises calcium stearoyl lactylate.

4. The composition of claim 3, wherein said first emulsifier (a) comprises calcium stearoyl lactylate having an acid value from about 60 to about 80 and an ester value from about 150 to about 190.

5. The composition of claim 1, wherein said second emulsifier (b) comprises a distilled monoglyceride having an iodine value from about 50 to about 120.

6. The composition of claim 5, wherein said second emulsifier (b) comprises a distilled monoglyceride having an iodine value from about 75 to about 85.

7. The composition of claim 1, wherein said third emulsifier (c) comprises lecithin derived from soybean oil.

8. The composition of claim 7, wherein said third emulsifier (c) comprises lecithin derived from soybean oil having an acetone insolubles level from about 60% to about 62%.

9. The composition of claim 1, wherein said shortening (d) comprises a liquid vegetable oil.

10. The composition of claim 9, wherein said shortening (d) comprises a partially hydrogenated and winterized soybean oil having an iodine value from about 100 to about 110.

11. The composition of claim 1, wherein the weight ratio of said shortening (d) to the sum of said emulsifiers (a), (b) and (c) is about 2:1.

12. The composition of claim 1, wherein said first emulsifier (a), said second emulsifier (b) and said third emulsifier (c) each comprise from about 5% to about 17% by weight of said fluid emulsified shortening composition.

13. The composition of claim 12, wherein said first emulsifier (a), said second emulsifier (b) and said third emulsifier (c) each comprise about 11% by weight of said fluid emulsified shortening composition.

14. A fluid emulsified shortening composition comprising:
   (a) a first emulsifier comprising one or more edible salts of stearoyl lactylate;
   (b) a second emulsifier comprising a distilled monoglyceride having an iodine value from about 50 to about 120;
   (c) a third emulsifier comprising lecithin derived from soybean oil; and
   (d) a shortening comprising a liquid vegetable oil, wherein the weight ratio of said shortening (d) to the sum of said emulsifiers (a), (b) and (c) is about 2:1.

15. The composition of claim 14, wherein said first emulsifier (a) comprises calcium stearoyl lactylate.

16. The composition of claim 15, wherein said first emulsifier (a) comprises calcium stearoyl lactylate having an acid value from about 60 to about 80 and an ester value from about 150 to about 190.

17. The composition of claim 14, wherein said second emulsifier (b) comprises a distilled monoglyceride having an iodine value from about 75 to about 85.

18. The composition of claim 14, wherein said third emulsifier (c) comprises lecithin derived from soybean oil having an acetone insolubles level from about 60% to about 62%.

19. The composition of claim 14, wherein said shortening (d) comprises a partially hydrogenated and winterized soybean oil having an iodine value from about 100 to about 110.

20. A process for producing an edible product, comprising the steps of:
   (a) blending a first ingredient comprising one or more edible compounds in an appropriate form with a second ingredient comprising the composition of claim 1 or claim 14 to produce a mixture; and
   (b) processing the mixture produced in step (a) by baking to produce an edible product.

21. The process of claim 20, wherein said edible product is a yeast-raised food.

22. The process of claim 21, wherein said yeast-raised food is bread.

23. The process of claim 22, wherein the composition of claim 1 or claim 14 is added at about 3% to the weight of flour.

24. An edible product comprising the composition of any one of claims 1 or 14.

25. A process for improving the quality of yeast-raised food which comprises adding to said yeast-raised food or to a preparative component thereof an effective amount of the composition of claim 1 or claim 14.

26. The process of claim 25, wherein said yeast-raised food is bread.

27. A process for retarding the staling of yeast-raised food which comprises adding to said yeast-raised food or to a preparative component thereof an effective amount of the composition of claim 1 or claim 14.

28. The process of claim 27, wherein said yeast-raised food is bread.

29. A process for conditioning yeast-raised food which comprises adding to said yeast-raised food or to a preparative component thereof an effective amount of the composition of claim 1 or claim 14.

30. The process of claim 29, wherein said yeast-raised food is bread.

31. A process for retarding the oxidation of yeast-raised food which comprises adding to said yeast-raised food or to a preparative component thereof an effective amount of the composition of claim 1 or claim 14.

32. The process of claim 31, wherein said yeast-raised food is bread.

33. A process for improving the crumb texture and loaf volume of bread which comprises adding to said bread or to a preparative component thereof an effective amount of the composition of claim 1 or claim 14.

34. An edible product produced by the process of claim 20.

35. A process for producing a fluid emulsified shortening composition for use in yeast-raised food processing, comprising the steps of:
(a) blending a first emulsifier comprising one or more compounds selected from the group consisting of edible salts of stearoyl lactylate and diacetic tartaric acid esters of monoglycerides, a second emulsifier comprising one or more monoglycerides and a third emulsifier comprising lecithin with a shortening comprising a liquid edible oil to produce a mixture;
(b) processing the mixture produced in step (a) by heating to a temperature sufficient to produce a molten blend;
(c) processing the molten blend produced in step (b) by cooling to produce a chilled blend; and
(d) processing the chilled blend produced in step (c) by agitating to produce a fluid emulsified shortening composition.

36. The process of claim 35, wherein at step (a) said first emulsifier comprises one or more compounds selected from the group consisting of calcium stearoyl lactylate and sodium stearoyl lactylate.

37. The process of claim 36, wherein at step (a) said first emulsifier comprises calcium stearoyl lactylate.

38. The process of claim 37, wherein at step (a) said first emulsifier comprises calcium stearoyl lactylate having an acid value from about 60 to about 80 and an ester value from about 150 to about 190.

39. The process of claim 35, wherein at step (a) said second emulsifier comprises a distilled monoglyceride having an iodine value from about 50 to about 120.

40. The process of claim 39, wherein at step (a) said second emulsifier comprises a distilled monoglyceride having an iodine value from about 75 to about 85.

41. The process of claim 35, wherein at step (a) said third emulsifier comprises lecithin derived from soybean oil.

42. The process of claim 41, wherein at step (a) said third emulsifier comprises lecithin derived from soybean oil having an acetone insolubles level from about 60% to about 62%.

43. The process of claim 35, wherein at step (a) said shortening comprises a liquid vegetable oil.

44. The process of claim 43, wherein at step (a) said shortening comprises a partially hydrogenated and winterized soybean oil having an iodine value from about 100 to about 110.

45. The process of claim 35, wherein at step (a) the weight ratio of said shortening to the sum of said emulsifiers in said mixture is from about 4:1 to about 1:1.

46. The process of claim 45, wherein at step (a) the weight ratio of said shortening to the sum of said emulsifiers in said mixture is about 2:1.

47. The process of claim 35, wherein at step (a) said first emulsifier, said second emulsifier and said third emulsifier each comprise from about 5% to about 17% by weight of said mixture.

48. The process of claim 47, wherein at step (a) said first emulsifier, said second emulsifier and said third emulsifier each comprise about 11% by weight of said mixture.

49. The process of claim 35, wherein at step (b) the process for heating is heating said mixture to a temperature of about 140° F. to about 180° F.

50. The process of claim 35, wherein at step (c) the process for cooling is cooling to a temperature of about 60° F. to about 70° F. within about 5 minutes by passing said molten blend through a heat exchanger.

51. The process of claim 35, wherein at step (d) the process for agitating is agitating said chilled blend for at least two hours following the cooling at step (c).

52. A fluid emulsified shortening composition for use in yeast-raised food processing, produced by the process of any one of claims 35 to 51.

53. A process for producing an edible product, comprising the steps of:
(a) blending a first ingredient comprising one or more edible compounds in an appropriate form with a second ingredient comprising the composition of claim 52 to produce a mixture; and
(b) processing the mixture produced in step (a) by baking to produce an edible product.

54. The process of claim 53, wherein said edible product is a yeast-raised food.

55. The process of claim 54, wherein said yeast-raised food is bread.

56. An edible product produced by the process of claim 53.

57. The process of claim 55, wherein the composition of claim 49 is added at about 3% to the weight of flour.

58. An edible product comprising the composition of claim 52.

59. A process for improving the quality of yeast-raised food which comprises adding to said yeast-raised food or to a preparative component thereof an effective amount of the composition of claim 52.

60. The process of claim 59, wherein said yeast-raised food is bread.

61. A process for retarding the staling of yeast-raised food which comprises adding to said yeast-raised food or to a preparative component thereof an effective amount of the composition of claim 52.

62. The process of claim 61, wherein said yeast-raised food is bread.

63. A process for conditioning yeast-raised food which comprises adding to said yeast-raised food or to a preparative component thereof an effective amount of the composition of claim 52.

64. The process of claim 63, wherein said yeast-raised food is bread.

65. A process for retarding the oxidation of yeast-raised food which comprises adding to said yeast-raised food or to a preparative component thereof an effective amount of the composition of claim 52.

66. The process of claim 65, wherein said yeast-raised food is bread.

67. A process for improving the crumb texture and loaf volume of bread which comprises adding to said bread or to a preparative component thereof an effective amount of the composition of claim 52.

68. A process for producing a fluid emulsified shortening composition for use in yeast-raised food processing, comprising the steps of:

(a) blending a first emulsifier comprising one or more edible salts of stearoyl lactylate, a second emulsifier comprising a distilled monoglyceride having an iodine value from about 50 to about 120 and a third emulsifier comprising lecithin derived from soybean oil with a shortening comprising a liquid vegetable oil to produce a mixture, wherein the weight ratio of said shortening to the sum of said emulsifiers in said mixture is from about 4:1 to about 1:1;

(b) processing the mixture produced in step (a) by heating to a temperature sufficient to produce a molten blend;

(c) processing the molten blend produced in step (b) by cooling to produce a chilled blend; and (d) processing the chilled blend produced in step (c) by agitating to produce a fluid emulsified shortening composition, wherein said fluid emulsified shortening composition is pumpable at room temperature.

69. The process of claim 68, wherein at step (a) said first emulsifier comprises calcium stearoyl lactylate.

70. The process of claim 69, wherein at step (a) said first emulsifier comprises calcium stearoyl lactylate having an acid value from about 60 to about 80 and an ester value from about 150 to about 190.

71. The process of claim 68, wherein at step (a) said second emulsifier comprises a distilled monoglyceride having an iodine value from about 75 to about 85.

72. The process of claim 68, wherein at step (a) said third emulsifier comprises lecithin derived from soybean oil having an acetone insolubles level from about 60% to about 62%.

73. The process of claim 68, wherein at step (a) said shortening comprises a partially hydrogenated and winterized soybean oil having an iodine value from about 100 to about 110.

74. The process of claim 68, wherein at step (a) the weight ratio of said shortening to the sum of said emulsifiers in said mixture is about 2:1.

75. The process of claim 68, wherein at step (a) said first emulsifier, said second emulsifier and said third emulsifier each comprise from about 5% to about 17% by weight of said mixture.

76. The process of claim 75, wherein at step (a) said first emulsifier, said second emulsifier and said third emulsifier each comprise about 11% by weight of said mixture.

77. The process of claim 68, wherein at step (b) the process for heating is heating said mixture to a temperature of about 140° F. to about 180° F.

78. The process of claim 68, wherein at step (c) the process for cooling is cooling to a temperature of about 60° F. to about 70° F. within about 5 minutes by passing said molten blend through a heat exchanger.

79. The process of claim 68, wherein at step (d) the process for agitating is agitating said chilled blend for at least two hours following the cooling at step (c).

80. A fluid emulsified shortening composition for use in yeast-raised food processing, produced by the process of any one of claims 68 to 79.

81. A process for producing an edible product, comprising the steps of:

(a) blending a first ingredient comprising one or more edible compounds in an appropriate form with a second ingredient comprising the composition of claim 80 to produce a mixture; and (b) processing the mixture produced in step (a) by baking to produce an edible product.

82. The process of claim 81, wherein said edible product is a yeast-raised food.

83. The process of claim 82, wherein said yeast-raised food is bread.

84. The process of claim 83, wherein the composition of claim 80 is added at about 3% to the weight of flour.

85. An edible product produced by the process of claim 81.

86. An edible product comprising the composition of claim 80.

87. A process for improving the quality of yeast-raised food which comprises adding to said yeast-raised food or to a preparative component thereof an effective amount of the composition of claim 80.

88. The process of claim 87, wherein said yeast-raised food is bread.

89. A process for retarding the staling of yeast-raised food which comprises adding to said yeast-raised food or to a preparative component thereof an effective amount of the composition of claim 80.

90. The process of claim 89, wherein said yeast-raised food is bread.

91. A process for conditioning yeast-raised food which comprises adding to said yeast-raised food or to a preparative component thereof an effective amount of the composition of claim 80.

92. The process of claim 91, wherein said yeast-raised food is bread.

93. A process for retarding the oxidation of yeast-raised food which comprises adding to said yeast-raised food or to a preparative component thereof an effective amount of the composition of claim 80.

94. The process of claim 93, wherein said yeast-raised food is bread.

95. A process for improving the crumb texture and loaf volume of bread which comprises adding to said bread or to a preparative component thereof an effective amount of the composition of claim 80.

* * * * *